United States Patent [19]
Watanabe et al.

[11] Patent Number: 5,526,160
[45] Date of Patent: Jun. 11, 1996

[54] OPTICAL TRANSMITTER AND RECEIVER DEVICE WITH A SINGLE OPTICAL MODULE

[75] Inventors: Nobutaka Watanabe; Tadayuki Iwano, both of Tokyo, Japan

[73] Assignee: NEC Corporation, Tokyo, Japan

[21] Appl. No.: 366,111

[22] Filed: Dec. 29, 1994

Related U.S. Application Data

[63] Continuation of Ser. No. 880,016, May 8, 1992, abandoned.

[30] Foreign Application Priority Data

May 10, 1991 [JP] Japan .................................. 3-105840

[51] Int. Cl.$^6$ ................................................ H04B 10/00
[52] U.S. Cl. ........................... 359/163; 359/152; 359/161
[58] Field of Search ..................................... 359/152, 153, 359/154, 159, 163, 173, 161

[56] References Cited

U.S. PATENT DOCUMENTS

| | | | |
|---|---|---|---|
| 4,471,494 | 9/1984 | Keil et al. | 359/187 |
| 4,879,764 | 11/1989 | Walter | 359/152 |
| 5,027,434 | 6/1991 | Brahms et al. | 359/152 |
| 5,063,612 | 11/1991 | McKeown | 359/152 |
| 5,122,893 | 6/1992 | Tolbert | 359/152 |
| 5,268,917 | 12/1993 | Davies | 372/38 |

FOREIGN PATENT DOCUMENTS

| | | |
|---|---|---|
| 0313738 | 3/1993 | European Pat. Off. . |
| 62-30433 | 2/1987 | Japan . |

OTHER PUBLICATIONS

Patent Abstracts Of Japan, vol. 11, No. 209, 1987.
IEICE Transactions, vol. E74, No. 3, Mar. 1991, pp. 547–554, Suto et al., "Optical Receiver Design Considering Fiber Loss Fluctuation for Subscriber Loops".

*Primary Examiner*—Leo Boudreau
*Assistant Examiner*—Rafael Bacares
*Attorney, Agent, or Firm*—Sughrue, Mion, Zinn, Macpeak & Seas

[57] ABSTRACT

In an optical transmitter and receiver device, a transmitter receives a transmitting data signal and drives a laser diode to make the laser diode emit an optical data signal representative of the transmitting data signal. The laser diode simultaneously emits a backward optical leakage signal. A photodiode is disposed at a rear side of the laser diode and detects the backward optical leakage signal as an optical monitoring signal to produce an electric monitoring signal. The transmitter receives the electrical monitoring signal to control an output power of the laser diode at a stabilized level. When the transmitter receives no transmitting data signal, the laser diode functions as an optical amplifier for an incoming optical data signal thereto and delivers an amplified optical data signal to the photodiode. The photodiode converts the amplified optical data signal to an electrical reception signal. A receiver receives and decides the electrical reception signal to produce a received data signal representative of the incoming optical data signal. Thus, the laser diode and the photodiode can be formed in a single optical module so that the optical transmitter and receiver can be reduced in size and cost.

8 Claims, 4 Drawing Sheets

OPTICAL TRANSMITTER AND RECEIVER DEVICE WITH A SINGLE OPTICAL MODULE

This is a continuation of application No. 07/880,016, filed May 8, 1992, now abandoned.

BACKGROUND OF THE INVENTION

The present invention relates to an optical transmitter and receiver device for use in transmission and reception of optical signals in optical communication and data transmission systems, and in particular, to improvement of an optical module in the device.

A conventional optical transmitter and receiver device comprises two optical modules. One of them is an optical receiving module comprising a photodetector such as a photodiode and is connected to a receiver circuit to form an optical receiver. The photodetector converts an incoming optical data signal to an electrical reception signal and the receiver circuit decodes the electrical reception signal to produce a data signal representative of the incoming optical data signal.

The other is an optical transmitting module comprising a luminous element such as a laser diode and is connected to a transmitter circuit to form an optical transmitter. The transmitter circuit receives a transmitting data signal and drives the luminous element to make the luminous element emit an outgoing optical data signal representative of the transmitting data signal. The optical transmitting module often has a monitor photodetector for monitoring a power of the outgoing optical data signal to produce an electrical monitoring signal. The transmitter circuit receives the electrical monitoring signal and controls the luminous element to stabilize the emitting power of the luminous element.

Among various uses of such an optical transmitter and receiver device, is in a user's set connected to a subscriber optical line in an optical telecommunication system, or in a terminal equipment connected to a computer system through an optical cable.

The user's set and computer terminal equipment especially need to be small in size and low in cost. However, the conventional optical transmitter and receiver device unfortunately makes the user's set and computer terminal equipment large in size and high in cost, because it has two optical modules.

SUMMARY OF THE INVENTION

It is an object of the present invention to provide an optical transmitter and receiver device which comprises a single optical module and is, therefore, able to provide the user's set and computer terminal equipment with small size and low cost.

According to the present invention, an optical transmitter and receiver device is obtained which comprises: a single optical module comprising a luminous element for emitting an outgoing optical data signal representative of a transmitting data signal and a photodetector element for detecting an incoming optical data signal to produce an electrical reception signal representative of the incoming optical data signal; receiver circuit means coupled to the photodetector element and responsive to a receiver enabling signal and the electrical reception signal for processing and decoding the electrical reception signal to produce a received data signal representative of the incoming optical data signal; transmitter circuit means coupled to the luminous element and responsive to a transmitter enabling signal and the transmitting data signal for driving the luminous element to make the luminous element generate a light signal according to the transmitting data signal so as to transmit the transmitting data signal as the outgoing optical data signal; and transmitter and receiver control means coupled to the receiver circuit means and the transmitter circuit means for generating the receiver enabling signal in absence of the transmitting data signal applied thereto and generating the transmitter enabling signal when receiving the transmitting data signal.

The single optical module may be arranged so that the photodetector element receives, as an optical monitoring signal, a part of the light signal from the luminous element to produce an electrical monitoring signal, and the transmitter circuit means receives the electrical monitoring signal to control the luminous element to make the luminous element emit the outgoing optical data signal with a stabilized power level.

The luminous element may preferably be an element having a front and a rear end for emitting the outgoing optical data signal from the front end and an optical backward signal from the rear end in a forward direction and in a rearward direction, respectively, and for amplifying an optical signal incoming to the front end in the direction opposite the forward direction to produce an amplified optical signal from the rear end, and the photodetector element is disposed adjacent the rear end of the luminous element and receives the amplified optical signal and the optical backward signal as the incoming optical data signal and the optical monitoring signal, respectively.

Typically, the luminous element is a laser diode and the photodetector element is a photodiode.

In an aspect of the present invention, the transmitter circuit means comprises; driver means coupled to the luminous element and responsive to the transmitting data signal for driving the luminous element to make the luminous element emit the outgoing optical data signal and the optical monitoring signal, the driver means being disabled by an unable signal; mark to space ratio detecting means responsive to the transmitting data signal for detecting a mark to space ratio of the transmitting data signal to produce a mark to space ratio signal; and power control means coupled to the transmitter and receiver control means and responsive to the transmitter enabling signal for making the driver means in an operable state and for producing the unable signal without reception of the transmitter enabling signal, the power control means coupled to the photodetector element, the luminous element and the mark to space ratio detecting means and responsive to the electrical monitoring signal and the mark to space ratio signal for controlling the luminous element to make the luminous element generate the light signal with a stabilized power level.

According to an aspect of the present invention, the receiver circuit means comprises: preamplifier means coupled to the photodetector element for amplifying the electrical reception signal to produce a preamplifier output signal; automatic gain controlled amplifier means coupled to the preamplifier means and responsive to a gain control signal for amplifying the preamplifier output signal with a controlled gain to produce an amplified signal; gain control means coupled to the automatic gain controlled amplifier means and responsive to the amplified signal for producing the gain control signal; timing extracting means coupled to the automatic gain controlled amplifier means and responsive to the amplified signal for extracting timing information from the amplified signal; and decision means coupled to the transmitter and receiver control means, the automatic gain controlled amplifier means and the timing extracting means and responsive to the, receiver enabling signal for deciding the amplified signal with reference to the timing information to produce the received data signal.

DESCRIPTION OF PREFERRED EMBODIMENTS

Prior to the description of preferred embodiments of the present invention, a conventional optical transmitter and receiver device will be described.

Figure 1:
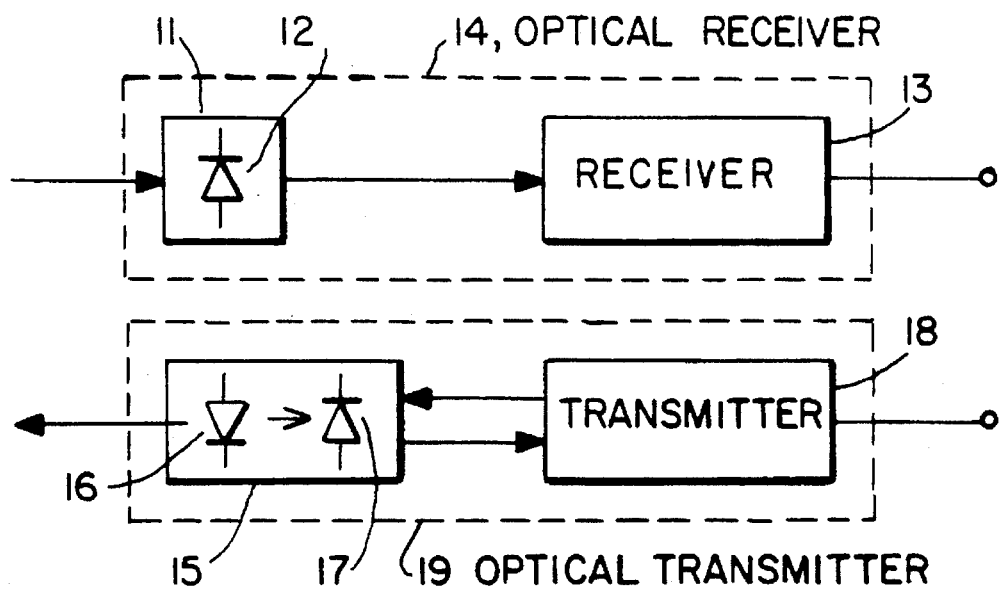
FIG. 1 is a block diagram view of a conventional optical transmitter and receiver device.

As shown in FIG. 1, the conventional optical transmitter and receiver device comprises an optical receiving module 11 comprising a photodetector such as a photodiode 12, and a receiver circuit 13 connected to the optical receiving module 11 to form an optical receiver 14. The photodiode 12 converts an incoming optical data signal to an electrical reception signal. The receiver circuit 13 receives and decodes the electrical reception signal and produces a data signal representative of the incoming optical data signal.

The conventional device shown in FIG. 1 further comprises an optical transmitting module 15 comprising a luminous element such as a laser diode 16 and a monitoring element such as a photodiode 17, and a transmitter circuit 18 connected to the optical transmitting module 15 to form an optical transmitter 19. The transmitter circuit 18 receives a transmitting data signal and drives the laser diode 16 to make laser diode 16 emit an outgoing data signal representative of the transmitting data signal. Then, the monitoring photodiode 17 detects an optical leakage signal backwardly emitted from the laser diode 16 to produce an electrical monitoring signal. The transmitter circuit 18 receives the electrical monitoring signal and controls the laser diode to make the laser diode 16 emit the outgoing optical data signal with a stabilized power level.

The conventional optical transmitter and receiver device has a disadvantage as described above.

Figure 2:
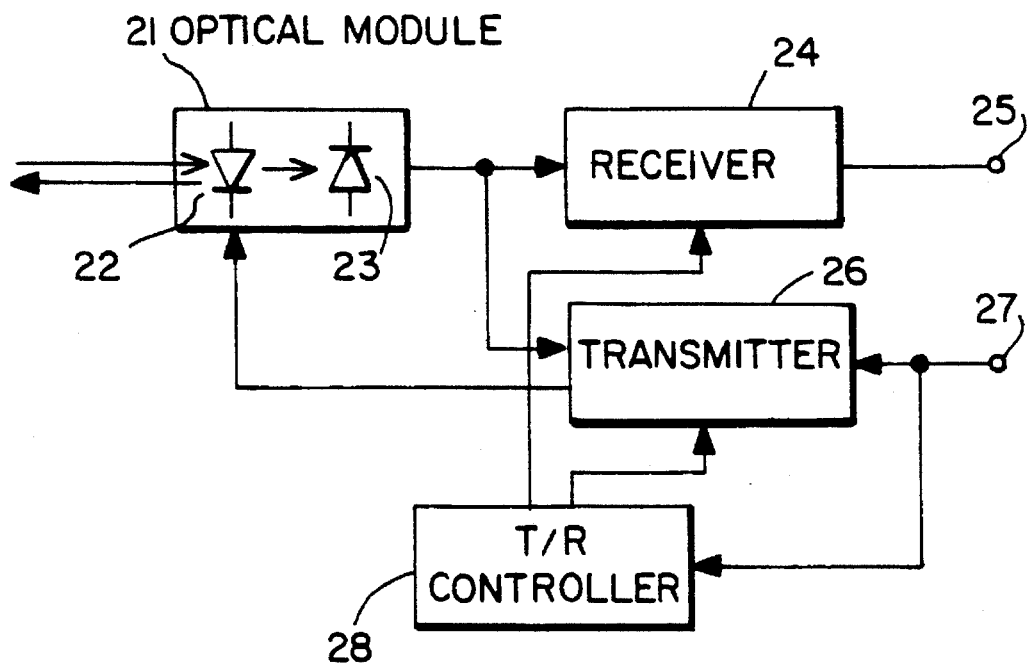
FIG. 2 is a block diagram view of an optical transmitter and receiver device according to an embodiment of the present invention.

As shown in FIG. 2, the optical transmitter end receiver device is an embodiment of the present invention and comprises a single optical module 21 comprising a luminous element 22 for emitting an outgoing optical data signal representative of a transmitting data signal and a photodetector element 23 for detecting an incoming optical data signal to produce an electrical reception signal representative of the incoming optical data signal.

The single optical module 21 is arranged so that the photodetector element 23 receives a park of a light signal generated from the luminous element 22 as an optical monitoring signal to produce an electrical monitoring signal. The electrical monitoring signal is used for controlling the luminous element 22 to make the luminous element 22 generate the light signal with a stabilized power level.

As the luminous element 22, a light emitting diode (LED) such as InGaAsP LED can be used. However, the luminous element 22 preferably is an element having a front and a rear end for emitting the outgoing optical data signal from the front end and the optical monitoring signal from the rear end in a forward direction and in a rearward direction, respectively, and for amplifying an optical signal incoming to the front end in the direction opposite the forward direction to produce an amplified optical signal from the rear end. Thus, the photodetector element 23 can be disposed adjacent the rear end of the luminous element 22 and receive the amplified optical signal as the incoming optical data signal and the optical monitoring signal.

As the luminous element 22 of the type described, a laser diode such as InGaAsP and AlGaAs laser diodes can be used.

A photodiode such as in InGaAsP diode and others is used as the photodetector element 23.

Figure 3:
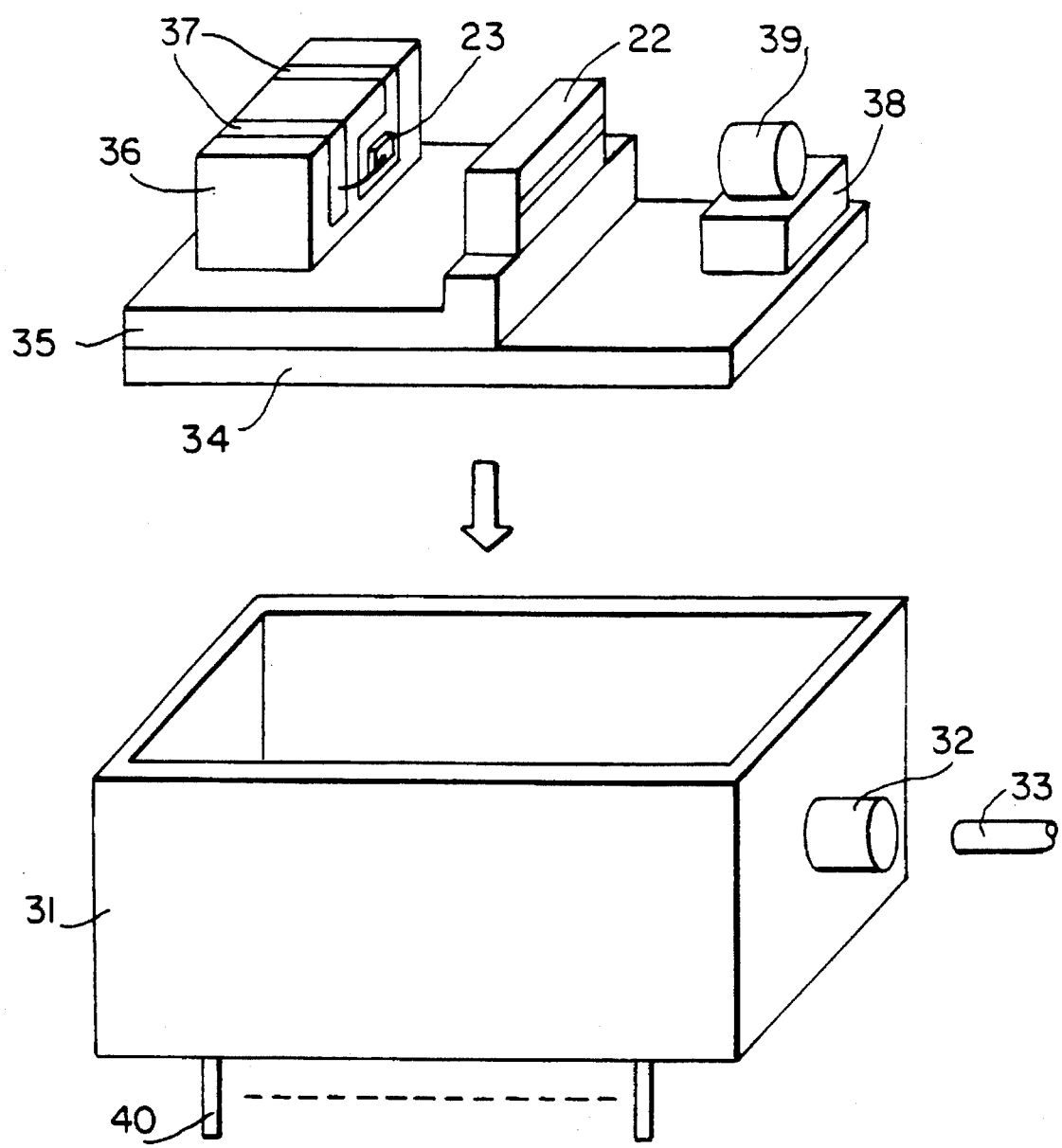
FIG. 3 is a perspective view of a single optical module used in the optical transmitter and receiver device of FIG. 2.

Turning to FIG. 3, the single optical module comprises a case 31 having an optical connector 32 to be coupled with an external optical cable 33. A plate or a mount 34 is inserted and fixedly disposed within the case 31. The laser diode 22 and the photodiode 23 are fixedly mounted on the mount 34. That is, a metallic support 35 as a heat sink is mounted on the mount 34 and the laser diode 22 is fixedly mounted on the support 35 by means of soldering. The support 35 may be provided with a cooling element such as a Peltier effect element. A supporting block 36 is provided with the photodiode 23 and an electrode pattern 37 associated therewith formed thereon and is fixedly mounted on the support 35. A lens support 38 is also fixedly mounted on the mount 34 and a lens 39 is fixedly mounted on the lens support 38 by means of adhesive. The optical connector 32, the lens 39, the laser diode 22 and the photodiode 23 are arranged on a common optical axis. A plurality of electrical terminal pins 40 are fixedly mounted to the case 31 for electrically connecting the laser diode 22 and the photodiode 23 with an external electric circuit such as a transmitter circuit and a receiver circuit as described hereinafter.

In the shown embodiment, the laser diode 22 and the photodiode 23 are separately formed on the different support and block 35 and 36 but can be formed in single semiconductor substrate as an optical integrated circuit. The lens 39 can be mounted within the optical connector 32. Further, the optical connector 32 can be contained an optical fiber of a predetermined length coupled to the lens 39. In that case, the external optical cable 33 can readily be connected to the optical connector 32 because optical connection can be performed between the optical fiber and the optical cable.

Returning to FIG. 2, a receiver circuit 24 is coupled to the photodiode 23. Responsive to a receiver enabling signal, the receiver circuit 24 is operable for processing and deciding the electrical reception signal from the photodiode 23 and produces on a data output terminal 25 a received data signal representative of the incoming optical data signal.

A transmitter circuit 26 is coupled to the laser diode 22. Responsive to a transmitter enabling signal, the transmitter circuit 26 is operable for driving the laser diode 22 to make the laser diode 22 generate the light signal representative of the transmitting data signal applied through a data input terminal 27, Thus, the laser diode 22 transmits the transmitting data signal as the outgoing optical data signal from the front end in the forward direction and emits the optical monitoring signal from the rear end.

The photodiode 23 receives the optical monitoring signal and produces the electrical monitoring signal. The transmitter circuit 26 receives the electrical monitoring signal and controls the laser diode 22 to make the laser diode 22 emit the outgoing optical data signal with a stabilized power level.

A transmitter and receiver controller 28 is coupled to the receiver circuit 24, the transmitter circuit 26 and the data input terminal 27. The transmitter and receiver controller 28 detects the transmitting data signal applied through the data input terminal 27, and generates the receiver enabling signal to the receiver circuit 24 in absence of the transmitting data signal applied thereto. On the other hand, the transmitter and receiver controller 28 generates the transmitter enabling signal when receiving the transmitting data signal through the data input terminal 27.

Figure 4:
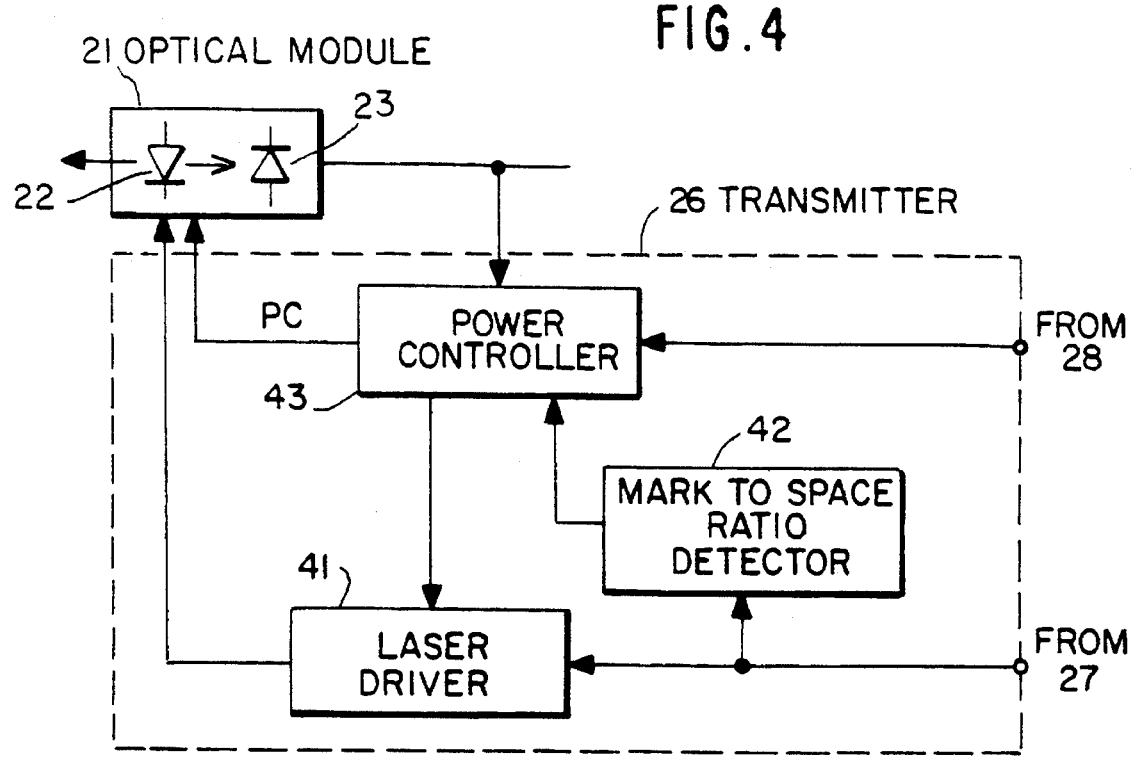
FIG. 4 is a block diagram view of a transmitter in the device of FIG. 2, with the optical module being shown together.

Turning to FIG. 4, the transmitter circuit 26 comprises a laser driver 41 coupled to the laser diode 22. The laser driver 41 receives the transmitting data signal and drives the laser diode 22 to make the laser diode 22 emit the outgoing optical data signal and the optical monitor signal. The laser driver 41 is disabled by a disable signal.

A mark to space ratio detector 42 receives the transmitting data signal and detects a mark to space ratio of the transmitting data signal to produce a DC signal having a DC level representative of the mark to space ratio as a mark to space ratio signal.

A power controller 43 is coupled to the transmitter and receiver controller 28. On reception of the transmitter enabling signal from the transmitter and receiver controller 28, the power controller 43 renders the laser driver 41 in an operable state. On the other hand, in absence of the transmitter enabling signal, the power controller 43 produces the unable signal. The power controller 43 is further coupled to the photodiode 23, the laser diode 22 and the mark to space ratio detector 42 and is responsive to the electrical monitoring signal and the mark to space ratio signal for controlling the laser diode 22 to make the laser diode 22 generate the outgoing optical data signal with a stabilized power level and the optical monitoring signal.

Figure 5:
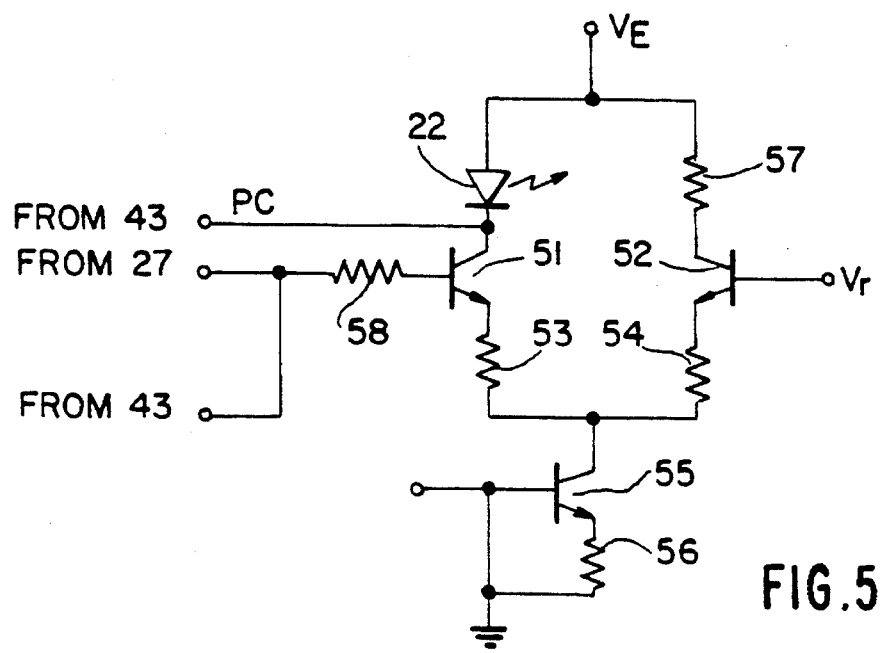
FIG. 5 is a circuit diagram view of s laser driver in the transmitter of FIG. 4, with a laser diode being shown together.

Turning to FIG. 5, a circuit of the laser driver 41 is shown together with the laser diode 22. The laser driver 41 comprises a circuit of a pair of NPN transistors 51 and 52. Emitters of those transistors 51 and 52 are commonly connected to a constant current circuit through emitter resistors 53 and 54. The constant current circuit comprises an NPN transistor 55 and a resistor 56 shown in the figure. A collector of the NPN transistor 51 is connected to a power source Ve through the laser diode 22 and a collector of the NPN transistor 52 is also connected to the power source through a collector resistor 57. The power controller 43 is connected to a common connection point of the laser diode 22 and the NPN transistor 51 so as to supply a power control (PC) signal to the laser diode 22. The power controller 43 is also connected to a base of the NPN transistor 51 through a base resistor 58 so as to supply the unable signal. A reference signal Vr is supplied to a base of the NPN transistor 52.

When the unable signal is not supplied to the base of the NPN transistor 51 from the power controller 43 and when the transmitting data signal is applied to the base of the NPN transistor 51 from the data input terminal 27, the laser diode 22 is turned "ON" and "OFF" in response to pulses of the transmitting data signal and produces the outgoing optical signal representative of the transmitting data signal.

The PC signal provides a prebias current for the laser diode 22 which is slightly less than an oscillating threshold value of the laser diode 22 so that, when the transistor 51 receives the transmitting data signal, the laser diode 22 generates the light signal representative of the transmitting data signal. The light signal is stabilized at a constant power level against any fluctuations such as variation of the mark to space ratio of the transmitting data signal, temperature variation and aging of the laser diode, because the PC signal is adjusted by the power controller 43 with reference to the monitoring signal and the mark to space ratio signal.

When the disable signal is supplied to the base of the NPN transistor 51, the base potential is lowered and the NPN transistor is cut off. However, the PC signal is applied to prebias the laser diode 22 slightly less than the oscillating threshold value. In this condition, when the laser diode 22 receives an optical signal incoming thereto, the laser diode 22 amplifies the incoming optical signal to produce an amplified optical signal. That is, the laser diode 22 functions as an optical amplifier.

Figure 6:
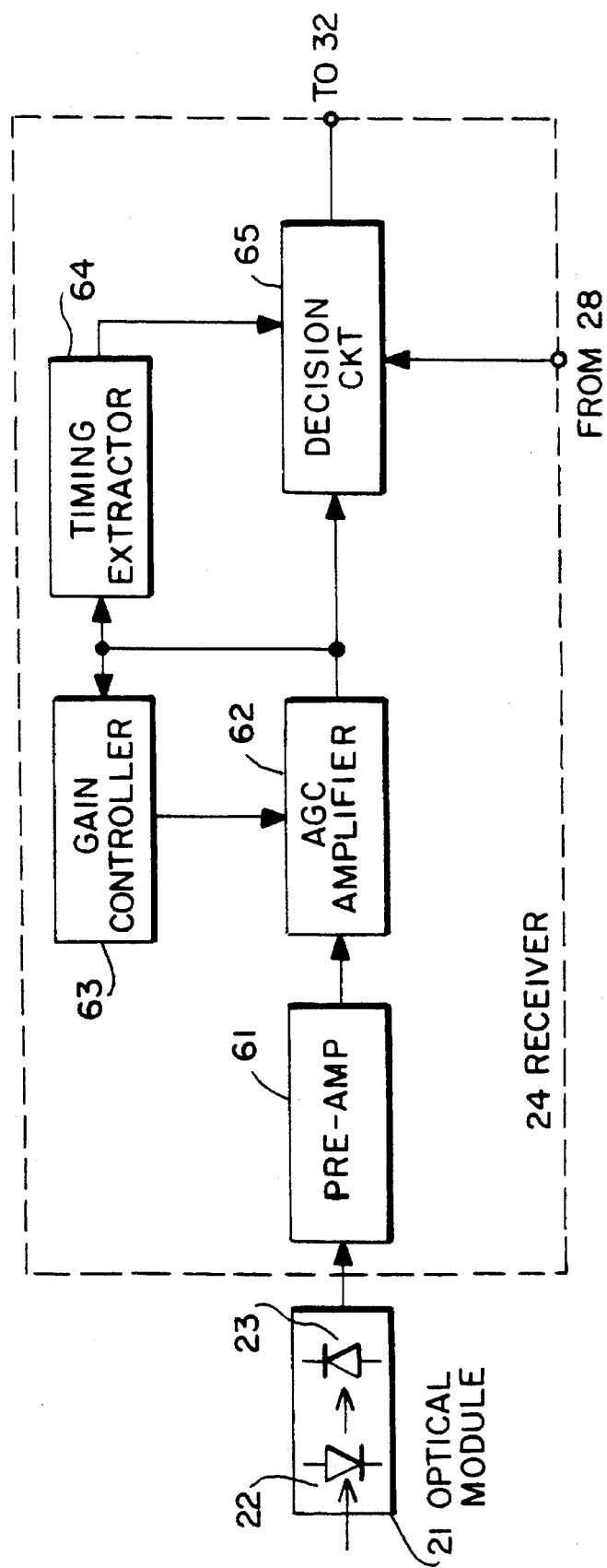
FIG. 6 is a block diagram view of a receiver in the device of FIG. 2, with the optical module being shown together.

Referring to FIG. 6, the receiver circuit 24 comprises a preamplifier (PRE-AMP.) 61 which is coupled with the photodiode 23.

When the transmitter circuit 26 is in the unable state, the laser diode 22 is not driven by the laser driver 41 but is biased so that the laser diode 22 is operable as an optical amplifier. Accordingly, the laser diode 22 receives and amplifies an optical signal incoming thereto to deliver it as the incoming optical data signal to the photodiode 23. The photodiode 23 detects the incoming optical data signal to produce the electrical reception signal.

The preamplifier 61 receives and amplifies the electrical reception signal to produce a preamplifier output signal.

An automatic gain controlled (AGC) amplifier 62 is coupled to the preamplifier 61 and is responsive to a gain control signal for amplifying the preamplifier output signal with a controlled constant gain to produce an amplified signal.

A gain controller 63 is coupled to the automatic gain controlled amplifier 62 and detects a peak level of the amplified signal for producing the gain control signal.

A timing extractor 64 is coupled to the automatic gain controlled amplifier 62 and is responsive to the amplified signal for extracting timing information from the amplified signal.

A decision circuit 65 is coupled to the transmitter and receiver controller 28, the automatic gain controlled amplifier 62 and the timing extractor 64. The decision circuit 65 is responsive to the receiver enabling signal and is operable for deciding the amplified signal with reference to the timing information to produce the received data signal on the data output terminal 25.

What is claimed is:

1. An optical transmitter and receiver device which comprises:

a single optical module comprising a luminous element for emitting an outgoing optical data signal representative of a transmitting data signal and a photodetector element for detecting an incoming optical data signal to produce an electrical reception signal representative of said incoming optical data signal, said photodetector element receiving, as an optical monitoring signal, a part of said outgoing optical data signal from said luminous element to produce an electrical monitoring signal;

receiver circuit means coupled to said photodetector element and responsive to a receiver enabling signal and said electrical reception signal for processing and decoding said electrical reception signal to produce a received data signal representative of said incoming optical data signal;

transmitter circuit means coupled to said luminous element and responsive to a transmitter enabling signal and said transmitting data signal for driving said luminous element to make said luminous element generate a light signal according to said transmitting data signal so as to transmit said transmitting data signal as said output optical data signal, said transmitter circuit means receiving said electrical monitoring signal to control said luminous element to make said luminous element emit said outgoing optical data signal with a stabilized power level; and transmitter and receiver control means coupled to said receiver circuit means and said transmitter circuit means for generating said receiver enabling signal in absence of said transmitting data signal applied thereto and generating said transmitter enabling signal when receiving said transmitting data signal;

said transmitter circuit means comprising:

driver means coupled to said luminous element and responsive to said transmitting data signal for driving said luminous element to make said luminous element emit said outgoing optical data signal and said optical monitoring signal, said driver means being disabled by a disable signal;

mark to space ratio detecting means responsive to said transmitting data signal for detecting a mark to space ratio of said transmitting data signal to produce a mark to space ratio signal; and power control means coupled to said transmitter and receiver control means and responsive to said transmitter enabling signal for rendering said driver means in an operable state and for producing said disable signal without reception of said transmitter enabling signal, said power control means coupled to said photodetector element, said luminous element and said mark to space ratio detecting means and responsive to said electrical monitoring signal and said mark to space ratio signal for controlling said luminous element to make said luminous element generate said light signal with a stabilized power level.

2. An optical transmitter and receiver device as claimed in claim 1, wherein said luminous element is an element having a front and a rear end for emitting said outgoing optical data signal from said front end and an optical backward signal from said rear end in a forward direction and in a rearward direction, respectively, and for amplifying an optical signal incoming to said front end in the direction opposite said forward direction to produce an amplified optical signal from said rear end, and said photodetector element is disposed adjacent said rear end of said luminous element and receives said amplified optical signal and said optical backward signal as said incoming optical data signal and said optical monitoring signal, respectively.

3. An optical transmitter and receiver device as claimed in claim 2, wherein said luminous element is a laser diode and said photodetector element is a photodiode.

4. An optical transmitter and receiver device as claimed in claim 3, wherein said single optical module comprises a case having an optical connector to be coupled with an external optical cable, a mount fixedly disposed within said case, said laser diode and said photodiode being fixedly mounted on said mount, terminal pins fixedly mounted to said case for electrically connecting said laser diode and said photodiode with said transmitter circuit means and said receiver circuit means, and lens means fixedly disposed to optically connected said optical connector and said laser diode.

5. An optical transmitter and receiver device as claimed in claim 2, wherein said receiver circuit means comprises:

preamplifier means coupled to said photodetector element for amplifying said electrical reception signal to produce a preamplifier output signal;

automatic gain controlled amplifier means coupled to said preamplifier means and responsive to a gain control signal for amplifying said preamplifier output signal with a controlled gain to produce an amplified signal;

gain control means coupled to said automatic gain controlled amplifier means and responsive to said amplified signal for producing said gain control signal;

timing extracting means coupled to said automatic gain controlled amplifier means and responsive to said amplified signal for extracting timing information from said amplified signal; and decision means coupled to said transmitter and receiver control means, said automatic gain controlled amplifier means and said timing extracting means and responsive to said receiver enabling signal for deciding said amplified signal with reference to said timing information to produce said received data signal.

6. An optical module for transmission and reception of light signals, comprising:

a luminous element selectively responsive to an enabling signal to enter into a transmission mode to emit a transmission optical signal corresponding to a data signal, said luminous element switching to a reception mode when receiving a disabling signal to optically amplify a received optical signal;

a photo-detector element arranged to detect said transmission optical signal and said received optical signal amplified by said luminous element, and to respectively emit a corresponding electrical control signal during transmission mode and a corresponding electrical reception signal during reception mode.

7. An optical transmitter and receiver device as claimed in claim 6, wherein said transmitter circuit receives said electrical monitoring signal to control said luminous element to make said luminous element emit said outgoing optical data signal with a stabilized power level.

8. An optical transmitter and receiver device as claimed in claim 6, wherein said transmitter circuit comprises:

a driver coupled to said luminous element and responsive to said transmitting data signal for driving said luminous element to make said luminous element emit said outgoing optical data signal and said optical monitoring signal, said driver means being disabled by disable signal;

mark to space ratio detecting means responsive to said transmitting data signal for detecting a mark to space ratio of said transmitting data signal to produce a mark to space ratio signal; and power controller coupled to said transmitter and receiver controller and responsive to said transmitter enabling signal for rendering said driver means in an operable state and for producing said disable signal without reception of said transmitter enabling signal, said power control means coupled to said photodetector element, said luminous element and said mark to space ratio detecting means and responsive to said electrical monitoring signal and said mark to space ratio signal for controlling said luminous element to make said luminous element generate said light signal with a stabilized power level.

* * * * *